(12) United States Patent
Seigler et al.

(10) Patent No.: US 8,659,980 B2
(45) Date of Patent: *Feb. 25, 2014

(54) RECORDING HEAD WITH WAVEGUIDE

(71) Applicant: Seagate Technology LLC, Cupertino, CA (US)

(72) Inventors: Michael Allen Seigler, Pittsburgh, PA (US); Michael Leigh Mallary, Harmony, PA (US); Hua Zhou, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,906

(22) Filed: Dec. 7, 2012

(65) Prior Publication Data

US 2013/0121121 A1 May 16, 2013

Related U.S. Application Data

(63) Continuation of application No. 12/277,497, filed on Nov. 25, 2008, now Pat. No. 8,331,205.

(51) Int. Cl.
*G11B 11/00* (2006.01)

(52) U.S. Cl.
USPC ............. 369/13.33; 369/13.13; 369/112.27

(58) Field of Classification Search
USPC .......... 369/13.33, 13.32, 13.24, 13.14, 13.03, 369/13.02, 13.12, 13.13, 13.22, 13.17, 369/112.27; 360/125.3, 125.09, 125.04, 360/125.17, 125.16, 125.31, 125.74, 59
See application file for complete search history.

(56) References Cited

U.S. PATENT DOCUMENTS

| | | | |
|---|---|---|---|
| 6,016,290 A * | 1/2000 | Chen et al. | 369/13.17 |
| 6,721,131 B2 | 4/2004 | Litvinov et al. | |
| 6,771,464 B2 | 8/2004 | Minor | |
| 6,822,829 B2 | 11/2004 | Minor et al. | |
| 7,266,268 B2 | 9/2007 | Challener et al. | |
| 7,729,085 B2 | 6/2010 | Jin et al. | |
| 7,791,839 B2 * | 9/2010 | Olson et al. | 360/125.31 |
| 7,869,309 B2 * | 1/2011 | Mihalcea et al. | 369/13.14 |
| 8,289,650 B2 * | 10/2012 | Seigler et al. | 360/125.3 |
| 8,331,205 B2 * | 12/2012 | Seigler et al. | 369/13.32 |
| 2003/0235121 A1 | 12/2003 | Eppler | |
| 2004/0001420 A1 | 1/2004 | Challener | |
| 2004/0008591 A1 | 1/2004 | Johns et al. | |
| 2004/0062503 A1 | 4/2004 | Challener | |
| 2005/0052771 A1 | 3/2005 | Rausch et al. | |
| 2005/0078565 A1 | 4/2005 | Peng et al. | |

(Continued)

FOREIGN PATENT DOCUMENTS

| | | |
|---|---|---|
| JP | 2003006803 A | 1/2003 |
| JP | 2005190655 A | 7/2005 |

*Primary Examiner* — Ali Neyzari
(74) *Attorney, Agent, or Firm* — HolzerIPLaw, PC

(57) ABSTRACT

An apparatus having a first pole with a first side and a second side opposite from the first side, a second pole positioned on the first side of the first pole, and a waveguide positioned on the second side of the first pole wherein the waveguide has an end adjacent to an air bearing surface. The first pole includes a first portion spaced from the waveguide and a second portion extending from the first portion to the air bearing surface, with the second portion being structured such that an end of the second portion is closer to the waveguide than the first portion.

20 Claims, 3 Drawing Sheets

(56) References Cited

U.S. PATENT DOCUMENTS

| | | |
|---|---|---|
| 2005/0111309 A1 | 5/2005 | Peng |
| 2005/0122850 A1 | 6/2005 | Challener et al. |
| 2005/0135008 A1 | 6/2005 | Challener et al. |
| 2005/0190682 A1 | 9/2005 | Gage et al. |
| 2005/0289576 A1 | 12/2005 | Challener |
| 2006/0119983 A1 | 6/2006 | Rausch et al. |
| 2007/0153417 A1 | 7/2007 | Suh et al. |
| 2008/0170319 A1 | 7/2008 | Seigler et al. |
| 2009/0073858 A1 | 3/2009 | Seigler et al. |

* cited by examiner

RECORDING HEAD WITH WAVEGUIDE

PRIORITY CLAIM

This application is a continuation of U.S. patent application Ser. No. 12/277,497 entitled, "Sloped Pole for Recording Head with Waveguide," filed Nov. 25, 2008, issued on Dec. 11, 2012 as U.S. Pat. No. 8,331,205, which is hereby incorporated by reference in its entirety.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

BACKGROUND

In thermally assisted magnetic recording, information bits are recorded on a data storage medium at elevated temperatures, and the heated area in the storage medium determines the data bit dimension. In one approach, a beam of light is condensed to a small optical spot onto the storage medium to heat a portion of the medium and reduce the magnetic coercivity of the heated portion. Data is then written to the reduced coercivity region.

Heat assisted magnetic recording (HAMR) has been developed to address instabilities that result from a reduction in grain size in magnetic recording media. HAMR generally refers to the concept of locally heating a storage medium to reduce the coercivity of the storage medium so that an applied magnetic writing field can more easily direct the magnetization of the storage medium during the temporary magnetic softening of the storage medium caused by the heat source. Heat assisted magnetic recording allows for the use of small grain media, which is desirable for recording at increased areal densities, with a larger magnetic anisotropy at room temperature to assure sufficient thermal stability.

One example of a recording head for use in heat assisted magnetic recording generally includes a write pole and a return pole magnetically coupled to each other through a yoke or pedestal, and a waveguide for focusing light onto the storage medium. One of the most challenging design requirements for an integrated HAMR head is in positioning the magnetic poles with respect to the focused spot in the waveguide. Magnetic materials such as alloys of Fe, Co and Ni are poor optical materials, so they cannot be positioned in close proximity with the waveguide for an appreciable distance.

SUMMARY

An aspect of the present invention is to provide an apparatus having a first pole with a first side and a second side opposite from the first side, a second pole positioned on the first side of the first pole, and a waveguide positioned on the second side of the first pole wherein the waveguide has an end adjacent to an air bearing surface. The first pole includes a first portion spaced from the waveguide and a second portion extending from the first portion to the air bearing surface, with the second portion being structured such that an end of the second portion is closer to the waveguide than the first portion.

Another aspect of the present invention is to provide an apparatus comprising a first pole, a second pole positioned on a side of the first pole, and a waveguide positioned on an opposing side of the first pole wherein the waveguide has an end adjacent to an air bearing surface. The first pole includes a first portion spaced from the waveguide and a second portion extending from the first portion toward the air bearing surface with the second portion being structured such that an end of the second portion is closer to the waveguide than the first portion.

A further aspect of the present invention is to provide a data storage device having a write pole with a first side and a second side opposite from the first side, a return pole positioned on the first side of the write pole, and a waveguide positioned on the second side of the write pole wherein the waveguide has an end adjacent to an air bearing surface. The write pole includes a first portion spaced from the waveguide and a second portion extending from the first portion to the air bearing surface wherein the second portion is structured such that an end of the second portion is closer to the waveguide than the first portion.

These and various other features and advantages will be apparent from a reading of the following detailed description.

DRAWINGS

DETAILED DESCRIPTION

Figure 1A:
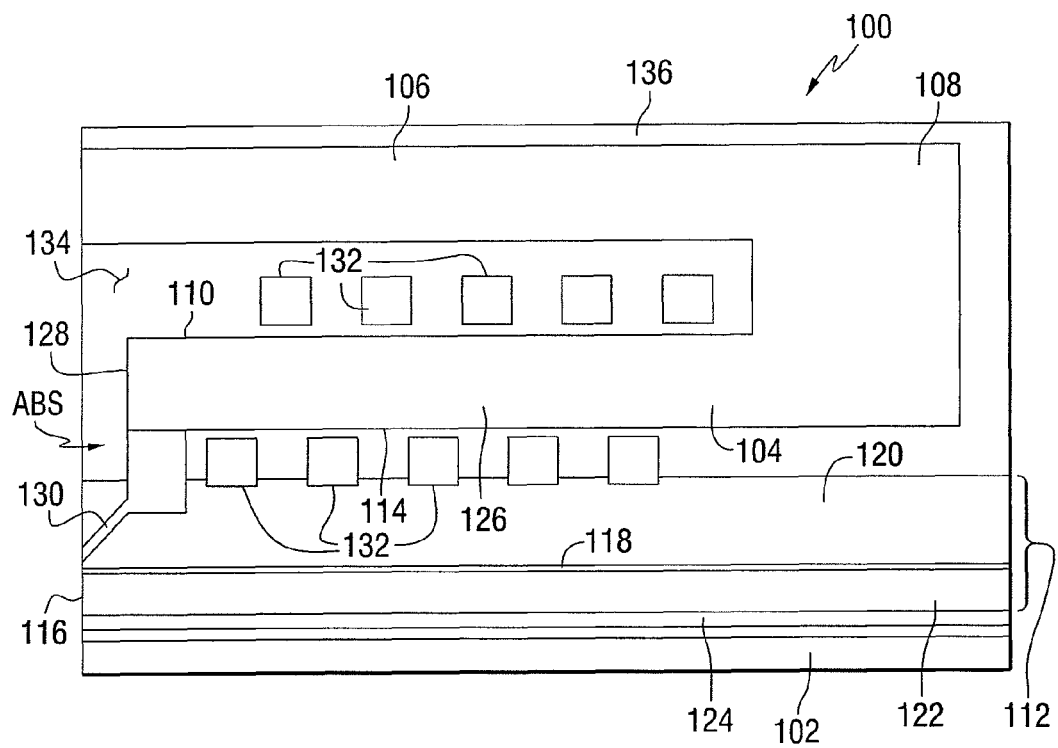
FIG. 1A is a cross-sectional view of a recording head, in accordance with an aspect of the invention.

In one aspect, the invention provides an apparatus for data storage. FIG. 1 is a pictorial representation of a data storage device 10 that can utilize an embodiment of the invention. The disc drive includes a housing 12 (with the upper portion removed and the lower portion visible in this view) sized and configured to contain the various components of the disc drive. The data storage device 10 includes a spindle motor 14 for rotating a data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired track 27 of the disc 16. The actuator motor 28 is regulated by a controller that is not shown in this view and is well-known in the art.

In one aspect, the invention has utility in, for example, a heat assisted magnetic recording (HAMR) system. In a HAMR system, an electromagnetic wave of, for example, visible, infrared or ultraviolet light is directed onto a surface of a data storage medium to raise the temperature of a localized area of the medium to facilitate switching of the magnetization of the area. Recent designs of HAMR recording heads include a thin film waveguide on a slider to guide light to the storage medium for localized heating of the storage medium. To launch light into the waveguide, a grating coupler can be used.

FIG. 1A is a cross-sectional view of a recording head 100 constructed in accordance with an aspect of the invention. The recording head includes a substrate 102, a first pole 104 (that may be, for example, a magnetic write pole), and a second pole 106 (that may be, for example, a magnetic return pole) that is magnetically coupled to the first pole 104 through a yoke or pedestal 108. The second pole 106 is positioned on a first side 110 of the first pole 104.

Still referring to FIG. 1A, the recording head includes a waveguide 112 that is positioned on a second side 114 of the first pole 104, i.e. the waveguide 112 and the second pole 106 are on opposite sides of the first pole 104. The waveguide 112 has an end 116 adjacent to an air bearing surface, generally represented by the letters ABS. The waveguide 112 includes a core layer 118 and cladding layers 120 and 122 on opposite sides of the core layer. A mirror 124 is positioned adjacent to one of the cladding layers.

Still referring to FIG. 1A, the first pole 104 is a two-piece pole that includes a first portion, or pole body 126, having a first end 128 that is spaced from the ABS, and a second portion, or sloped pole piece 130, extending from the first portion 128 and tilted in a direction toward the waveguide 112. The second portion 130 is structured to include an end adjacent to the ABS of the recording head 100, with the end being closer to the waveguide 112 than the first portion 126 of the first pole 104. As used in this description, a sloped pole piece is a pole piece that has a first end adjacent to the ABS, and a second end magnetically coupled to the body of the pole 104, wherein the first end is closer to the core layer 118 than the second end. In the example of FIG. 1A, the sloped pole piece includes a single layer but it will be appreciated that multiple layers may be utilized to form the sloped pole piece. Also, the sloped pole piece may have a uniform cross-sectional shape as shown, or could have other cross-sectional shapes as desired.

By using the configuration illustrated in FIG. 1A, there is no magnetic flux return path passing through the waveguide 112 which reduces magnetic interference between the poles and the waveguide so as to make the recording head more optically efficient. In addition, the waveguide 112 materials can be deposited before the writer portion, i.e. the poles, of the recording head is built. Thus, if a reader were to be built after the writer, high temperature processes could be used for the waveguide materials due to all the magnetic layers being built after the optical layers.

In one aspect of the invention, a helical coil 132 wraps around the first pole 104 (or alternatively around the second pole 106). While this example includes a helical coil, other types of coils, such as a planar coil, could be used. A planar coil would extend, for example, between the two poles and around the pedestal 108.

An insulating material 134 separates the coil turns. Another layer of insulating material 136 is positioned adjacent to the second pole 106. In one example, the substrate can be AlTiC, the core layer can be $Ta_2O_5$, and the cladding layers (and other insulating layers) can be $Al_2O_3$.

Figure 1B:
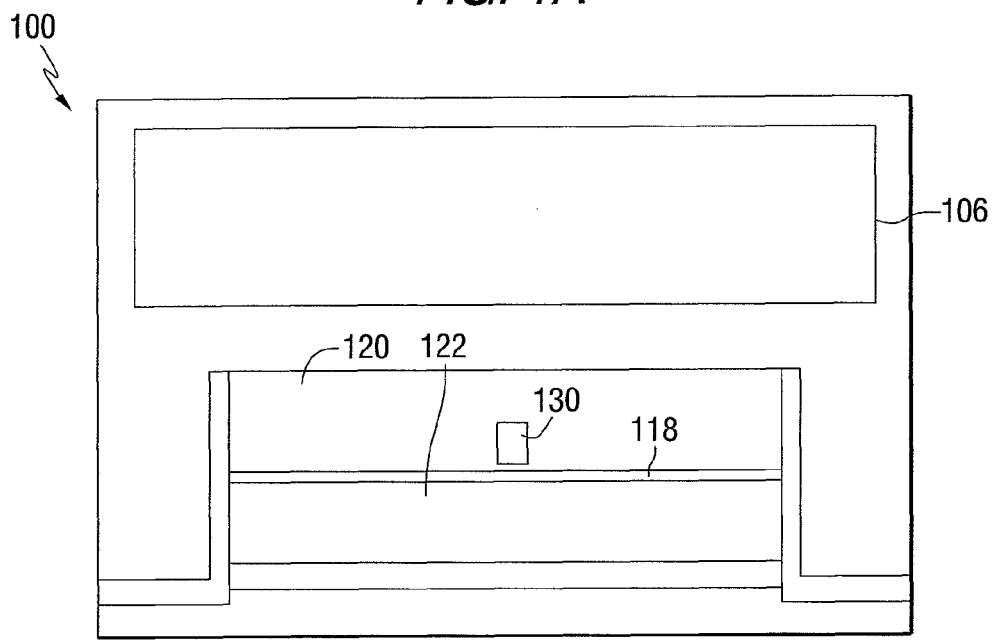
FIG. 1B is an ABS view of the recording head illustrated in FIG. 1A, in accordance with an aspect of the invention.

FIG. 1B is an ABS view of the recording head 100 illustrated in FIG. 1A. As shown, the second pole 106 is spaced from the first pole and, in particular, from the second portion 130 thereof.

Figure 2A:
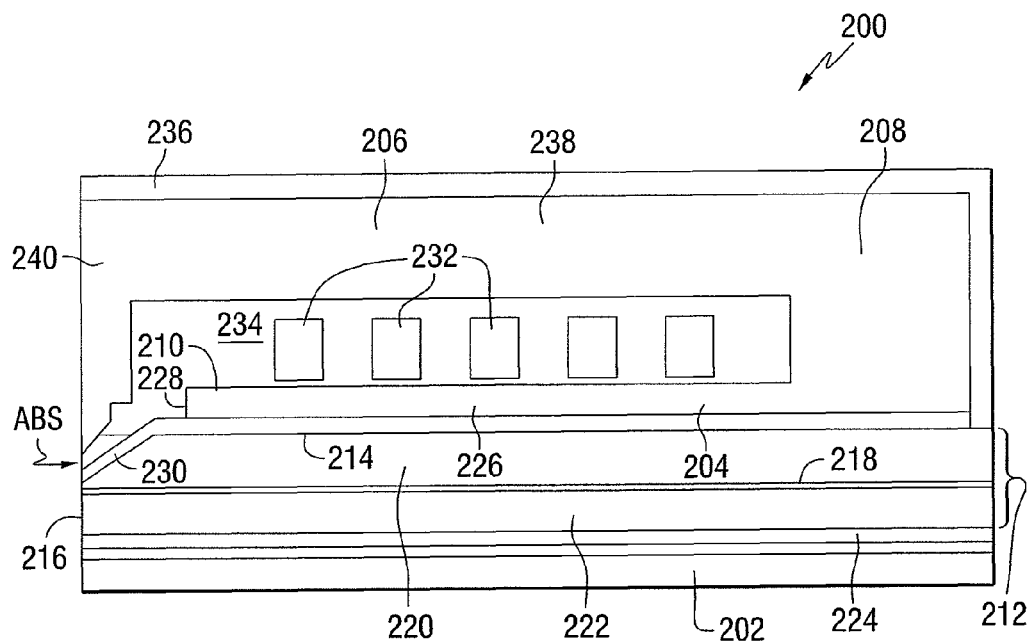
FIG. 2A is a cross-sectional view of a recording head, in accordance with another aspect of the invention.

FIG. 2A is a cross-sectional view of a recording head 200 constructed in accordance with another aspect of the invention. The recording head includes a substrate 202, a first pole 204 (that may be, for example, a magnetic write pole), and a second pole 206 (that may be, for example, a magnetic return pole) that is magnetically coupled to the first pole 204 through a yoke or pedestal 208. The second pole 206 is positioned on a first side 210 of the first pole 204.

Still referring to FIG. 2A, the recording head includes a waveguide 212 that is positioned on a second side 214 of the first pole 204, i.e. the waveguide 212 and the second pole 206 are on opposite sides of the first pole 204. The waveguide 212 has an end 216 adjacent to an air bearing surface, generally represented by the letters ABS. The waveguide 212 includes a core layer 218 and cladding layers 220 and 222 on opposite sides of the core layer. A mirror 224 is positioned adjacent to one of the cladding layers.

Still referring to FIG. 2A, the first pole 204 is a two-piece pole that includes a first portion, or pole body 226, having a first end 228 that is spaced from the ABS, and a second portion, or sloped pole piece 230, extending from the first portion 228 and tilted in a direction toward the waveguide 212. The second portion 230 is structured to include an end adjacent to the ABS of the recording head 200, with the end being closer to the waveguide 212 than the first portion 226 of the first pole 204. As used in this description, a sloped pole piece is a pole piece that has a first end adjacent to the ABS, and a second end magnetically coupled to the body of the first pole 204, wherein the first end is closer to the core layer 218 than the second end. In the example of FIG. 2A, the sloped pole piece includes a single layer but it will be appreciated that multiple layers may be utilized to form the sloped pole piece.

In this aspect of the invention, a planar coil 232 extends between the two poles 204, 206. An insulating material 234 separates the coil turns. Another layer of insulating material 236 is positioned adjacent to the second pole 206. In one example, the substrate can be AlTiC, the core layer can be $Ta_2O_5$, and the cladding layers (and other insulating layers) can be $Al_2O_3$.

Still referring to FIG. 2A, the second pole 206 includes a first or body portion 238 spaced from the first pole 204 and a second or end portion 240 extending from the first portion 238 adjacent the ABS, with the second portion 240 being structured such that the second portion 238 is closer to the first pole 204 than the first portion 238. In one aspect of the invention, the second portion 240 extends toward the second portion 230 of the first pole 204. By providing the second pole 206 with the second portion 240, the writing efficiency of the recording head 200 may be improved.

Figure 2B:
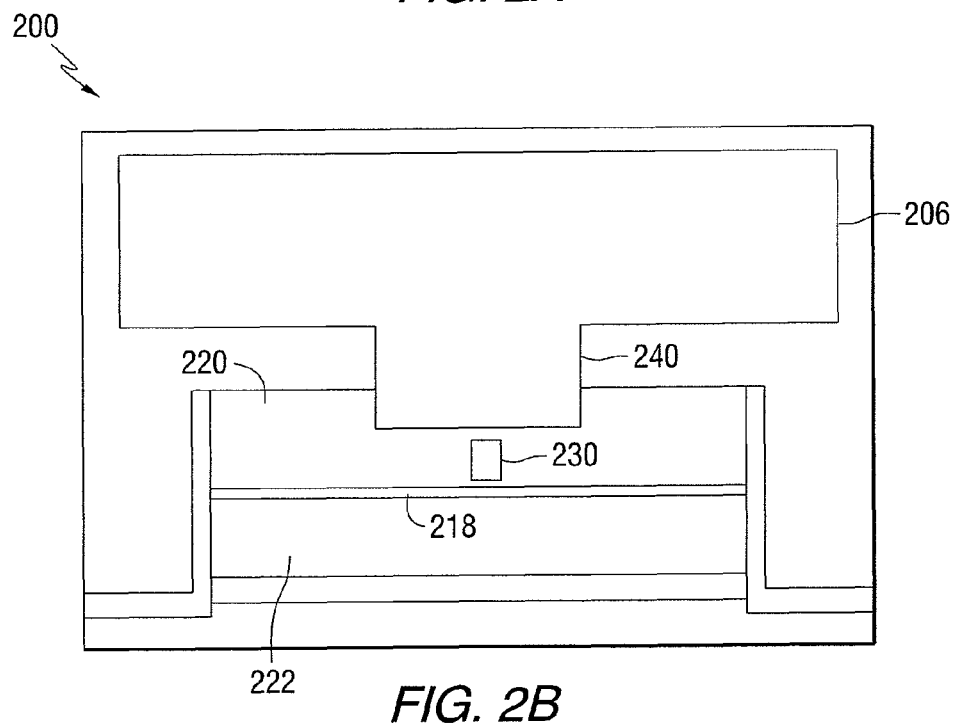
FIG. 2B is an ABS view of the recording head illustrated in FIG. 2A, in accordance with another aspect of the invention.

FIG. 2B is an ABS view of the recording head 200 illustrated in FIG. 2A. As shown, the second portion 240 of the second pole 206 is positioned closer to the second portion 230 of the first pole 204.

Figure 3:
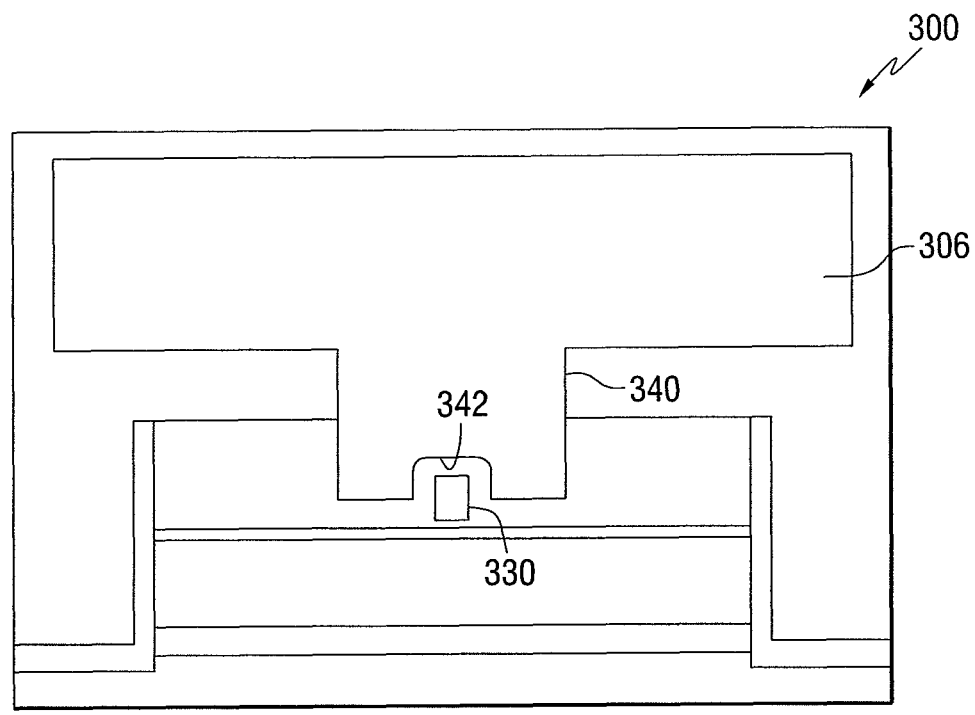
FIG. 3 is an ABS view of a recording head, in accordance with another aspect of the invention.

FIG. 3 is an ABS view of a recording head 300 that is similar to FIG. 2B, but illustrating an additional aspect of the invention. Specifically, the recording head 300 includes a second pole 306 includes an end portion 340 having a cutout 342 that is at least partially wrapped around the second portion 330 of the first pole.

Figure 4:
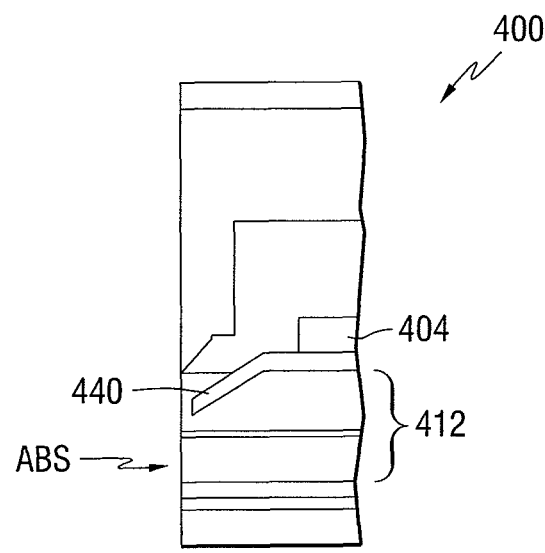
FIG. 4 is a partial cross-sectional view of a recording head, in accordance with an aspect of the invention.

FIG. 4 is a partial cross-sectional view of a recording head 400 that is similar to FIG. 2A, but constructed in accordance with another aspect of the invention. Specifically, in FIG. 4 the second portion or sloped pole piece 440 of the first pole 404 is spaced or recessed from the ABS. This allows for a more uniform field in the media where the thermal spot generated by the waveguide 412 is located, improve the optical efficiency and relaxes the processing constraints, such as the placement of the sloped wall with respect to the waveguide 412 or other optical components that may be utilized.

The implementation described above and other implementations are within the scope of the following claims.

What is claimed is:

1. An apparatus, comprising:
    a waveguide positioned on a first side of a first pole, the waveguide having an end adjacent to an air bearing surface,
    wherein the first pole includes a first portion spaced from the waveguide and a second portion extending from the first portion to the air bearing surface, with the second portion being structured such that an end of the second portion is closer to the waveguide than the first portion, and wherein the end of the second portion of the first pole is spaced from the air bearing surface.

2. The apparatus of claim 1, wherein the first pole is a write pole.

3. The apparatus of claim 1, further comprising a second pole positioned on the second side of the first pole, the second side being opposite from the first side of the first pole.

4. The apparatus of claim 3, wherein the first pole is magnetically coupled to the second pole.

5. The apparatus of claim 3, wherein the second pole includes a first portion of the second pole spaced from the first pole and a second portion of the second pole extending from the first portion of the second pole to the air bearing surface, with the second portion of the second pole being structured such that the second portion of the second pole is closer to the first pole than the first portion of the second pole.

6. The apparatus of claim 3, wherein the second pole is at least partially wrapped around the first pole.

7. The apparatus of claim 3, further including means for energizing the first pole and the second pole.

8. The apparatus of claim 7, wherein the means for energizing the first pole and the second pole includes a helical coil or a planar coil.

9. The apparatus of claim 1, wherein the second portion has a uniform cross-sectional shape.

10. An apparatus, comprising:
    a second pole positioned on a side of a first pole; and
    a waveguide positioned on an opposing side of the first pole,
    wherein the first pole includes a first portion spaced from the waveguide and a second portion extending from the first portion toward an air bearing surface, with the second portion being structured such that an end of the second portion is closer to the waveguide than the first portion, and wherein the second portion of the first pole slopes away from the second pole.

11. The apparatus of claim 10, wherein the end of the first portion of the first pole is spaced from the air bearing surface.

12. The apparatus of claim 11, wherein the waveguide is closer to the air bearing surface than the end of the first portion of the first pole.

13. The apparatus of claim 1, wherein the second pole includes a first portion of the second pole spaced from the first pole and a second portion of the second pole extending from the first portion of the second pole to the air bearing surface, with the second portion of the second pole being structured such that an end of the second portion of the second pole is closer to the first pole than the first portion of the second pole.

14. A data storage device, comprising:
    a waveguide positioned on a second side of a write pole, the second side being opposite from a first side of the write pole and the waveguide having an end adjacent to an air bearing surface,
    wherein the write pole includes a first portion spaced from the waveguide and a second portion extending from the first portion to the air bearing surface, wherein an end of the first portion of the first pole is spaced from the air bearing surface.

15. The data storage device of claim 14, further including means for energizing the write pole.

16. The data storage device of claim 15, wherein the means for energizing the write pole includes a helical coil or a planar coil.

17. The data storage device of claim 14, further comprising a return pole positioned on the first side of the write pole, wherein the return pole includes a first portion of the return pole spaced from the write pole and a second portion of the return pole extending from the first portion of the return pole to the air bearing surface, with the second portion of the return pole being structured such that an end of the second portion of the return pole is closer to the write pole than the first portion of the return pole.

18. The data storage device of claim 14 configured as a heat assisted magnetic recording device.

19. The apparatus of claims 1, wherein the second portion of the first pole slopes away from the second pole.

20. The apparatus of claims 14, wherein the second portion of the first pole slopes away from the second pole.

* * * * *